United States Patent [19]

Hoffmann

[11] Patent Number: 4,778,362
[45] Date of Patent: Oct. 18, 1988

[54] OUTER ENVELOPE TROCHOIDAL ROTARY DEVICE HAVING A TWO PIECE ROTOR ASSEMBLY

[75] Inventor: Ralph Hoffmann, Eden Prairie, Minn.

[73] Assignee: Compression Technologies, Inc., Eden Prairie, Minn.

[21] Appl. No.: 947,101

[22] Filed: Dec. 29, 1986

[51] Int. Cl.⁴ .......................... F01C 1/10; F01C 21/08
[52] U.S. Cl. ..................... 418/61.3; 418/91; 418/270
[58] Field of Search ............... 418/61 A, 61 B, 61 R, 418/91, 151, 181, 270; 29/156.4 R, 156.5 R; 74/573 R; 73/468, 469

[56] References Cited

U.S. PATENT DOCUMENTS

| | | | |
|---|---|---|---|
| 3,059,585 | 10/1962 | Froede et al. | 418/61 A |
| 3,111,884 | 11/1963 | Hoffman | 418/61 B |
| 3,134,337 | 5/1964 | Paschke | 418/61 A |
| 3,396,667 | 8/1968 | Schmitt | 418/152 |
| 3,799,706 | 3/1974 | Bilobran | 418/61 A |
| 3,877,849 | 4/1975 | Wieland | 418/61 A |
| 3,920,358 | 11/1975 | Wieland | 418/61 A |

FOREIGN PATENT DOCUMENTS 0164688  8/1985  Japan .................. 418/151
1366113  12/1970  United Kingdom .

Primary Examiner—John J. Vrablik
Assistant Examiner—Leonard P. Walnoha
Attorney, Agent, or Firm—Hill, Van Santen, Steadman & Simpson

[57] ABSTRACT

An outer envelope trochoidal device is provided. The device includes a rotor shaft and rotor assembly, the rotor assembly having a peripheral surface that defines a trochoidal curve and includes a first and a second rotor half. Each rotor half has a trochoidal profile surface and an inner circular surface. The rotor shaft includes secured thereto a cylindrical sleeve that includes a radial flange to which at least one of the rotor halves is secured. The rotor halves are secured to each other by counterbolt means extending laterally through the rotor halves. One rotor half can include a tapped hole in the outer peripheral surface of the rotor and a channel extending from the end of the tapped hole to the sleeve on the rotor shaft. A chamber is defined by a portion of the sleeve and a portion of the rotor half pinned to the sleeve, the chamber being in fluid communication with the channel. When a fluid under pressure is injected into the channel and thereby the volume through the tap hole, the rotor halves are caused to separate and disengage the rotor shaft.

9 Claims, 2 Drawing Sheets

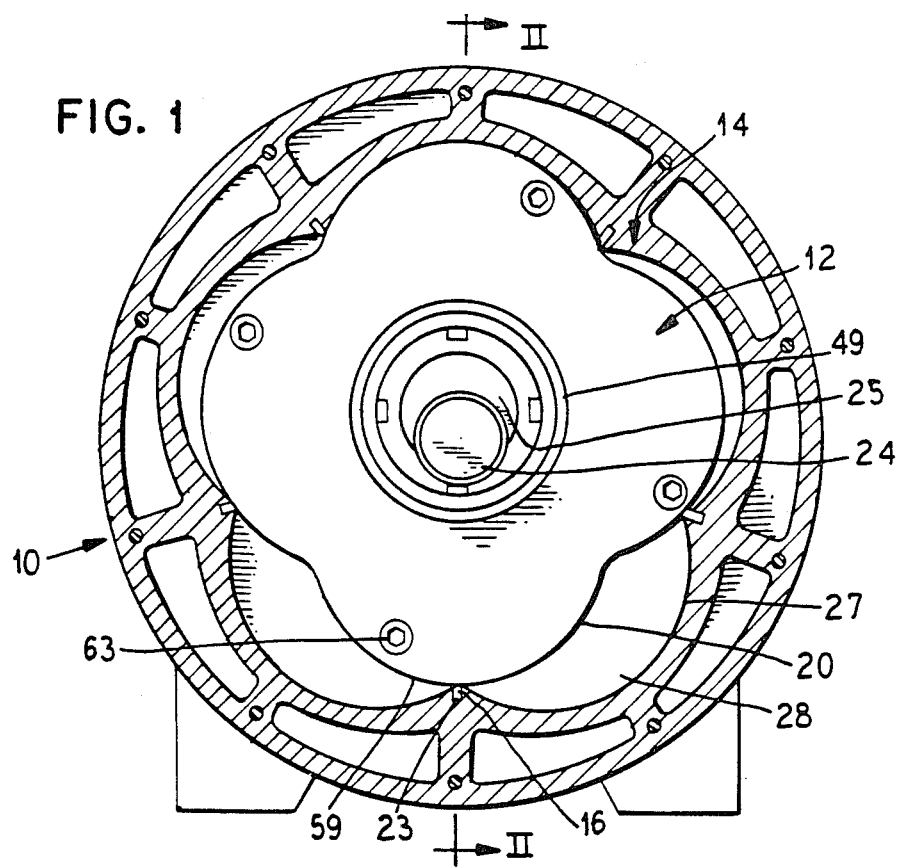
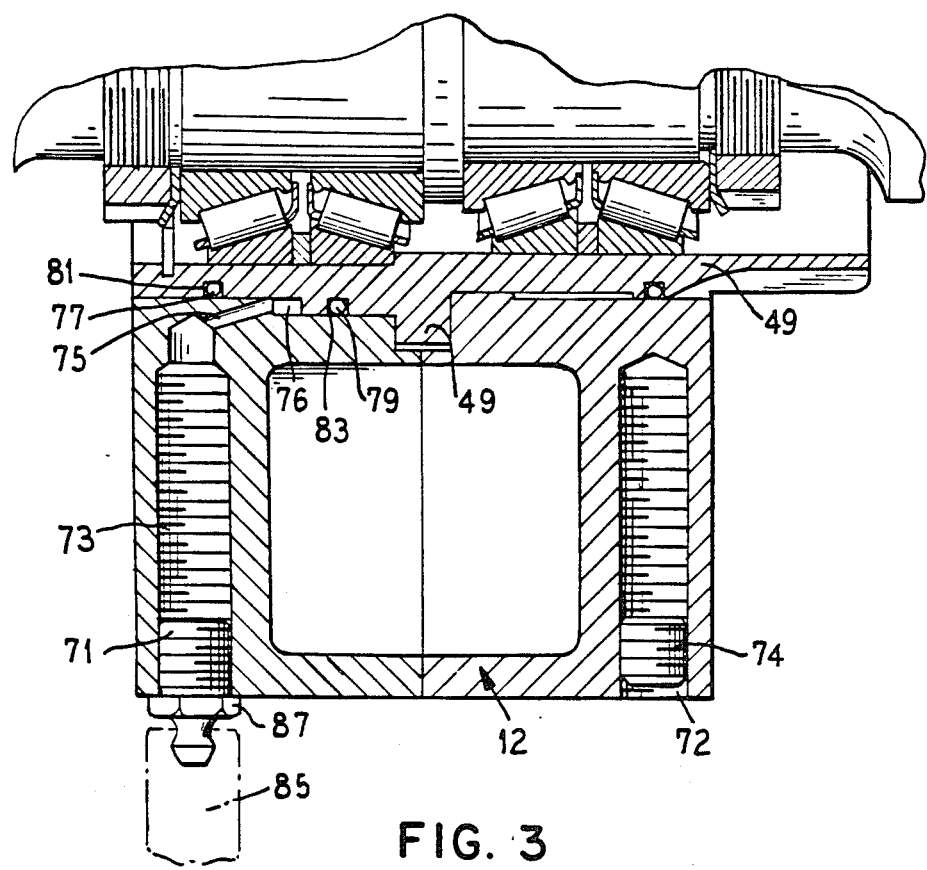

OUTER ENVELOPE TROCHOIDAL ROTARY DEVICE HAVING A TWO PIECE ROTOR ASSEMBLY

BACKGROUND OF THE INVENTION

This invention relates generally to rotary devices. More specifically, this invention relates to outer envelope trochoidal rotary devices.

Trochoidal rotary devices are constructed so that a rotor assembly planetarily rotates in a housing defining a cavity. Trochoidal rotary devices can be divided into two groups: inner envelope trochoidal devices; and outer envelope trochoidal devices. In an inner envelope trochoidal device, the rotor assembly includes apex seals that cooperate with the inner wall surface of the housing to define a plurality of discrete chambers. In an outer envelope trochoidal device, the apex seals are mounted in the inner wall of the housing between individual working chambers. The peripheral surface of the rotor assembly cooperates with the apex seals to define a plurality of discrete chambers. Accordingly, the rotor assembly of an outer envelope trochoidal device functions, in part, to seal off the working chambers of the device. The peripheral surface of the rotor assembly and inner wall of the housing function as working chambers for expansion engines, compressors, expanders, meters, etc.

In an outer envelope trochoidal device, because the peripheral surface of the rotor assembly cooperates with the apex seals of the inner housing to provide a working chamber, it is necessary for the peripheral surface of the rotor assembly to have a construction that will create a seal between the rotor assembly surface and the apex seal. If a seal is not created between the apex seal and peripheral surface of the rotor assembly, the efficiency of the engine or compressor will suffer.

In order to ensure that the rotor assembly planetates correctly in the rotor housing, the rotor assembly must be balanced. Typically, rotor assemblies are balanced by counterweights that are located outside the rotor on the shaft that planetates the rotor assembly. Although it is possible to balance the rotor assembly with these counterweights, it is usually difficult to make the fine balancing adjustments that may be needed.

In a single-piece cast rotor, requiring a sand core, it is not possible to locate the casing in the machining process such that the finished wall thicknesses are all identical. This means that it is literally impossible to machine the casting in such a way that it is reasonably balanced. Since the sides and the periphery of the casting must be essentially smooth, with no interruptions that would cause seal collisions, there is very little surface on the outside of the casting available for removing material to balance it. A two-piece casting would be desireable since the casting can be made without coring, and it is possible to locate the casting in the lathe such that the finished wall thicknesses are identical, thus minimizing the amount of balancing necessary in the finished rotor.

Furthermore, it is desireable for the rotor assembly to be easily disassembled. For example, if a two piece rotor assembly were developed, it would be advantageous if it were easily disassembled so that the bearings could be easily removed for maintenance and repair.

Accordingly, there is a need for an improved rotor for an outer envelope trochoidal device.

SUMMARY OF THE INVENTION

The present invention provides an outer envelope trochoidal device. The device includes a rotor shaft and rotor assembly, the rotor assembly having a peripheral surface that defines a trochoidal curve and includes a first and a second rotor half. Each rotor half has a trochoidal profile surface and an inner circular surface. The rotor shaft includes secured thereto a cylindrical sleeve that includes a radial flange to which at least one of the rotor halves is secured. The rotor halves are secured to each other by counterbolt means extending laterally through the rotor halves.

Preferably, the rotor halves define a cavity between the rotor halves when they are secured to the cylindrical sleeve. Preferably, the sleeve includes a radially extending flange having at least one aperture and one of the rotor halves includes at least one corresponding aperture, the rotor half being secured to the sleeve by a pin received in the aperture in the rotor and the sleeve.

In an embodiment, preferably, one of the rotor halves includes means for separating the rotor halves from the sleeve. Preferably, the means for separating includes a tapped hole in the outer peripheral surface of the rotor half and a channel extending from the end of the tapped hole to the sleeve on the rotor shaft. Preferably, a chamber is defined by a portion of the sleeve and a portion of the rotor half pinned to the sleeve, the chamber being in fluid communication with the channel. When a fluid under pressure is injected into the channel and thereby into the chamber through the tapped hole, the rotor havles are caused to separate and disengage the sleeve on the rotor shaft.

BRIEF DESCRIPTION OF THE DRAWINGS

FIG. 1 illustrates a cross-sectional perspective view of an embodiment of the rotary device of this invention.

FIG. 3 illustrates an enlarged view of another cross-sectional view of the rotary device of this invention.

DETAILED DESCRIPTION OF THE PRESENTLY PREFERRED EMBODIMENTS

Figure 2:
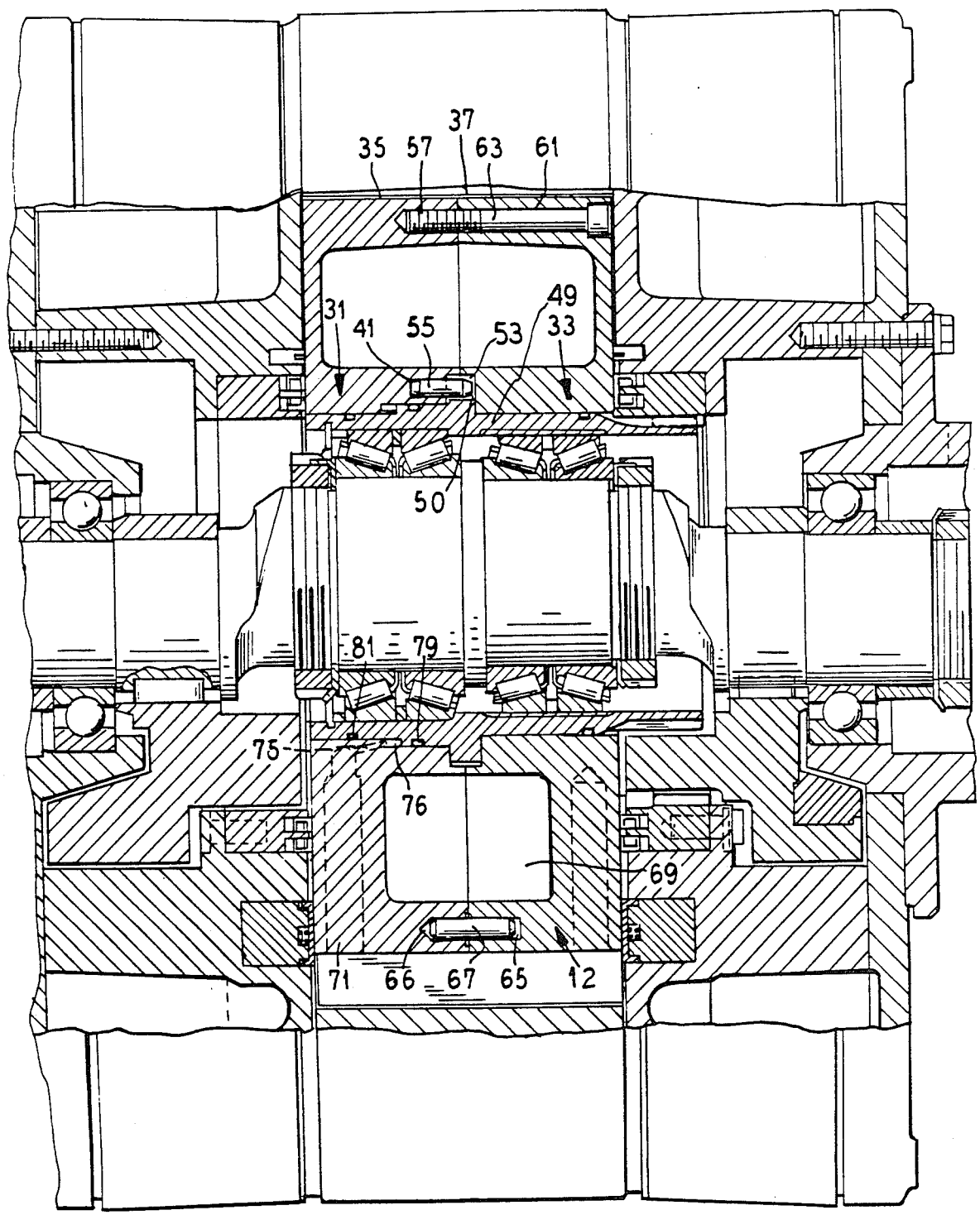
FIG. 2 illustrates a cross-sectional view taken along lines II—II of FIG. 1.

Referring to FIG. 1, a cross-sectional view of an outer envelope trochoidal rotary device of the present invention is illustrated. As used herein the term trochoidal device refers to devices that have modified trochoidal curves or, for example, use a curve parallel to a trochoidal curve. The trochoidal rotary device 10 includes a rotor 12, a housing 14, and a rotary shaft center 24. The rotor 12 moves in a planetating fashion about the shaft 24 within the housing 14 over an eccentric lobe 25 part of the shaft. The rotor 12, as discussed in more detail below, is rotatably mounted over the eccentric via gear sleeve 49. The trochoidal rotary device 10 uses the space formed between the peripheral wall surface 27 of the housing 14 and the peripheral surface 20 of the rotor 12 to define fluid working chambers 28 for engines, compressors, expanders, meters, etc.

As illustrated, the trochoidal rotary device 10 is an outer envelope trochoidal rotary device having apex seals 16 located in slots 23 in the peripheral wall surface 27 of the housing 14. The radially extending apex seals 16 function to provide a means for sealing the working chambers 28 across the peripheral wall 27 of the housing 14. Accordingly, the rotor 12 and the apex seals 16 cooperate to define working chambers 28 in the rotary device 10.

As the rotor 12 planetates around the peripheral wall 27 of the housing 14, each lobe cooperates with two of the apex seals 16 to define a working chamber 28. The rotation of the rotor 12 relative to the housing 14 is utilized to vary the volume of the working chambers 28. This variation in volume is utilized to perform work or to produce a motive power. Accordingly, it is critical that a seal is effected between the apex seals 16 and the peripheral surface 20 of the rotor 12. A failure to establish a sufficiently tight seal will result in a corresponding loss of efficiency.

Referring now to FIGS. 2 and 3, as illustrated, the rotor 12 of the present invention is a two piece rotor. To this end, the rotor includes a first rotor half 31 and a second rotor half 33. Each of the rotor halves 31 and 33 include a peripheral surface 35 and 37 respectively that defines a trochoidal curve. Accordingly, when the rotor two halves 31 and 33 are secured together, they define a trochoidal curve.

The two rotor halves 31 and 33 are secured to each other and to the gear sleeve 49. To this end, as illustrated, the first rotor half 31 of the rotor assembly 12 includes at least one aperture 41. The aperture 41 allows the first rotor half 31 to be mounted to a gear sleeve 49 that is secured to the eccentric on the shaft. The gear sleeve 49 includes radial flange 50 that extends from the gear sleeve 49 and includes an aperture 53. To secure the first rotor half 31 to the gear sleeve 49, and thereby the shaft, a pin 55 is received within the aperture 51 in the radial flange 53 and the aperture 41 in the first rotor half 12 pinning the first rotor half to the sleeve. As discussed in detail below, once the first half 31 is so pinned, then the second rotor half 33 can be secured to the first rotor half.

Preferably, the first rotor half 31 also includes an aperture 57 in each lobe 59 located near the radial edge of the lobe. This aperture 57 corresponds to an aperture 61 in the second rotor half 33 that is designed to receive a countersunk bolt 63. Accordingly, the countersunk bolt 63 is received in the aperture 61 in the second rotor half 33 and the aperture 57 in the first rotor half 31 to secure the two rotor halves together. In the preferred embodiment illustrated, the countersunk bolt 63 includes threads and each aperture 57 and 61 is correspondingly threaded.

Each rotor half 31 and 33 also preferably includes locating pin apertures 65 and 66 for receiving locating pins 67. The locating pins 67 ensure that the rotor halves 31 and 33 are securely fastened together. The locating pins 67 are needed because of the clearance between the apertures 57 and 61 and countersunk bolts 33. Without locating pins 67 there would be a tendency for the rotor halves 31 and 33 to wobble. It has been found that two locating pins 67 prevent the rotor halves 31 and 33 from wobbling. Of course, if desired, more than or less than two locating pins 67 can be used.

As illustrated, when the two rotor halves 31 and 33 are secured together they define a chamber 69 in each lobe. If desired, additional weights, such as a nub, can be added within the chamber 69 to properly balance the rotor 12. Also, portions of the chamber 69 can be machined away to properly balance the rotor 12. Accordingly, the two piece rotor and chamber 69 provides a rotor 12 that can be properly balanced by the addition or deletion of material from the interior of the rotor 12 prior to the rotor halves 31 and 33 being secured together.

It is also possible to locate counterweights (not shown) within the chamber 69 defined between the rotor halves 31 and 33. The counterweights can either be secured on the gear sleeve 49 onto which the rotor 12 is mounted, or, the counterweights can be constructed so that they run along the peripheral surface of the chamber 69.

The peripheral surfaces 35 and 37 of the rotor halves 31 and 33 are preferably machined as a dedicated pair. Accordingly, the peripheral surfaces 35 and 37 are then lapped, disassembled, and hardened. When they are reassembled they create a perfect fit in the rotor housing 14. Because of its two piece construction, the rotor 12 of the present invention has a lower casting cost.

The first rotor half 31, in the embodiment illustrated, may also include a means for separating the rotor halves 31 and 33, the means for separating includes a tapped hole 71 in the peripheral surface of the lobe. The tapped hole 71 extends from the outer peripheral surface of the first rotor half 31 radially inward towards the rotor shaft. As disclosed in U.S. patent application, Ser. No. 948,126, entitled, "Peripheral Reliefs in A Trochoidal Rotor Assembly", filed in the name of Ralph M. Hoffmann, the disclosure of which is incorporated herein by reference, the tapped hole 71 can be utilized to provide a means for balancing the rotor 12. To this end, the tapped hole 71 defines a threaded aperture 73 that is designed to receive adjustable set screws 74. As its name implies, the adjustable set screws can be adjusted to balance the rotor 12. Accordingly, the tapped holes provide a means for fine balancing the rotor 12. As set forth in detail below, the tapped hole 71 also provides a means for separating the rotor halves 31 and 33. As illustrated the second rotor half 33 can also include a tapped hole 72 for balancing the rotor 12.

Located at an end of the tapped hole 71 is a channel 75. The channel 75 is in fluid communication with the tapped hole 71 and an annular chamber 76 or volume, that is defined by a portion of the first half of the rotor 31 and the gear sleeve 49. Two o-rings 77 and 79 located in annular slots 81 and 83 in the gear sleeve 49 seal the chamber 76. The channel 75, chamber 76, and tapped hole 71 define a means for separating the rotor halves and removing the rotor halves 31 and 33 from the gear sleeve 49. To this end, once the countersunk bolts 63 have been removed, pressurized fluid is injected into the tapped hole 71 and the channel 75 and thereby into the annular chamber 76. The fluid pressur in the chamber 76 causes a piston effect causing the first rotor half 31 to move away from the gear sleeve 49 and the second rotor half 33. This causes the rotor halves 31 and 33 to separate and the first rotor half 31 to separate from the gear sleeve 49.

Accordingly, a means for separating rotor halves 31 and 33 and removing the rotor halves from the gear sleeve 49 is provided. In use, for example, a grease gun 85 can be inserted into the tapped hole 71 and grease injected into the tapped hole 71 and channel 75 to cause the rotor halves 31 and 33 to separate from the gear sleeve 49. Because the tapped holes 71 are preferably threaded the grease can be injected by threading a threaded grease gun fitting 87 into the tapped hole. Ordinarily, sufficient pressure can be exerted by a hand pressure grease gun to separate the two halves 31 and 33 of the rotor from the gear sleeve 49 by this action. Accordingly, one can separate the two halves 31 and 33 of the rotor 12 to maintain and replace the bearings.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An outer envelope trochoidal device including a rotor shaft and rotor assembly, the rotor assembly including two rotor halves and having a peripheral surface that defines a trochoidal profile surface, at least one of the rotor halves being removably secured to a sleeve on the rotor shaft and including means for separating the rotor half from the shaft, the rotor halves being secured together by bolts extending laterally through the rotor halves, the means for separating includes a tapped hole in the outer peripheral surface of the rotor and a channel extending from an end of the tap hole to the sleeve on the rotor shaft and a volume defined by a portion of the sleeve and a portion the rotor half pinned to the sleeve, the volume being in fluid communication with the channel, said volume being adaptable to apply fluid pressure to the sleeve and rotor half to facilitate removal of the rotor from the sleeve.

2. The outer envelope trochoidal device of claim 1 wherein the rotor halves define a cavity between the rotor halves when they are secured together.

3. The outer envelope device of claim 1 wherein the sleeve includes a radially extending flange having at least one aperture, and one of the rotor halves includes at least one corresponding aperture, the rotor having being removably secured to the sleeve by a pin received within the aperture in the rotor and the sleeve.

4. The outer envelope trochoidal device of claim 3 wherein each rotor half includes at least one aperture for receiving a locator pin.

5. An outer envelope trochoidal device including a rotor shaft and rotor assembly, the rotor assembly having a peripheral surface that defines a trochoidal curve and comprising first and second halves, each rotor half having a trochoidal profile surface, one of the rotor halves being removably secured to a sleeve on the rotor shaft and including means for separating the rotor half from the sleeve and the second rotor half, the means for separating the rotor half from the sleeve including a tapped hole in the peripheral surface of the rotor and a channel in the rotor half, the channel and tapped hole being in fluid communication wherein the means for separating includes an annular chamber defined in part by the removably secured rotor half and in part by the rotor sleeve, the annular chamber being in fluid communication with the channel, the annular chamber being adaptable to apply fluid pressure to the sleeve and rotor half to facilitate removal of the rotor from the sleeve.

6. The outer envelope trochoidal device of claim 5 wherein the tapped hole is threaded.

7. The outer envelope trochoidal device of claim 5 wherein each rotor half includes at least one aperture for receiving a countersunk bolt means for securing the rotor halves together.

8. The outer envelope trochiodal device of claim 7 wherein each rotor half includes at least one aperture for receiving at least one locator pin.

9. The outer envelope trochiodal device of claim 7 wherein the sleeve includes a radial flange having an aperture and the first rotor half includes a corresponding aperture that receives a pin and removably secures the first rotor half to the sleeve.

* * * * *